(12) United States Patent
Russo et al.

(10) Patent No.: US 8,495,757 B2
(45) Date of Patent: Jul. 23, 2013

(54) SYSTEM AND METHOD FOR PLACING AN ELECTRONIC APPARATUS INTO A PROTECTED STATE IN RESPONSE TO ENVIRONMENTAL DATA

(75) Inventors: Leonard E. Russo, Tomball, TX (US); Walter A. Gaspard, Magnolia, TX (US); Jeff W. Wolford, Spring, TX (US); Richard J. Tomaszewski, Magnolia, TX (US); Robert C. Elliott, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 553 days.

(21) Appl. No.: 12/765,041

(22) Filed: Apr. 22, 2010

(65) Prior Publication Data

US 2011/0265191 A1 Oct. 27, 2011

(51) Int. Cl.
  *G06F 21/02* (2006.01)
(52) U.S. Cl.
  USPC ............ 726/34; 726/2; 726/23; 713/151; 713/170; 713/178
(58) Field of Classification Search
  USPC .......................................................... 726/34
  See application file for complete search history.

(56) References Cited

U.S. PATENT DOCUMENTS

| | | | |
|---|---|---|---|
| 6,549,774 B1 * | 4/2003 | Titlebaum et al. | 455/427 |
| 6,938,174 B2 | 8/2005 | LeKuch et al. | |
| 7,320,093 B2 | 1/2008 | Yagi | |
| 7,596,643 B2 | 9/2009 | Merry, Jr. et al. | |
| 7,702,920 B2 * | 4/2010 | Okamoto | 713/191 |
| 8,224,576 B2 * | 7/2012 | Jensen et al. | 702/2 |
| 2002/0172115 A1 | 11/2002 | Tsukihashi | |
| 2003/0200471 A1 * | 10/2003 | Suzuki et al. | 713/300 |
| 2004/0127197 A1 * | 7/2004 | Roskind | 455/412.2 |
| 2005/0203430 A1 * | 9/2005 | Williams et al. | 600/513 |
| 2007/0107068 A1 * | 5/2007 | Kelley et al. | 726/34 |
| 2008/0098489 A1 * | 4/2008 | McEwan et al. | 726/34 |
| 2008/0224857 A1 * | 9/2008 | Lupoli et al. | 340/539.23 |
| 2008/0235441 A1 | 9/2008 | Sherman | |
| 2009/0012633 A1 * | 1/2009 | Liu et al. | 700/90 |
| 2009/0126029 A1 * | 5/2009 | Benoit et al. | 726/34 |
| 2009/0164811 A1 * | 6/2009 | Sharma et al. | 713/310 |
| 2009/0267780 A1 * | 10/2009 | Van Hoff et al. | 340/635 |
| 2010/0159908 A1 * | 6/2010 | Chang et al. | 455/418 |

* cited by examiner

*Primary Examiner* — Kambiz Zand
*Assistant Examiner* — Yonas Bayou

(57) ABSTRACT

A system and method is disclosed for placing an electronic apparatus into a protected state in response to environmental data. The method discloses: receiving a set of environmental data applicable to an electronic apparatus; generating an environmental status applicable to the electronic apparatus based-on the environmental data; and placing the electronic apparatus into a protected state based-on the environmental status. The system discloses an environment characterization module which receives a set of environmental data applicable to an electronic apparatus, and generates an environmental status applicable to the electronic apparatus based-on the environmental data; and an apparatus protection module which places the electronic apparatus into a protected state based-on the environmental status.

20 Claims, 3 Drawing Sheets

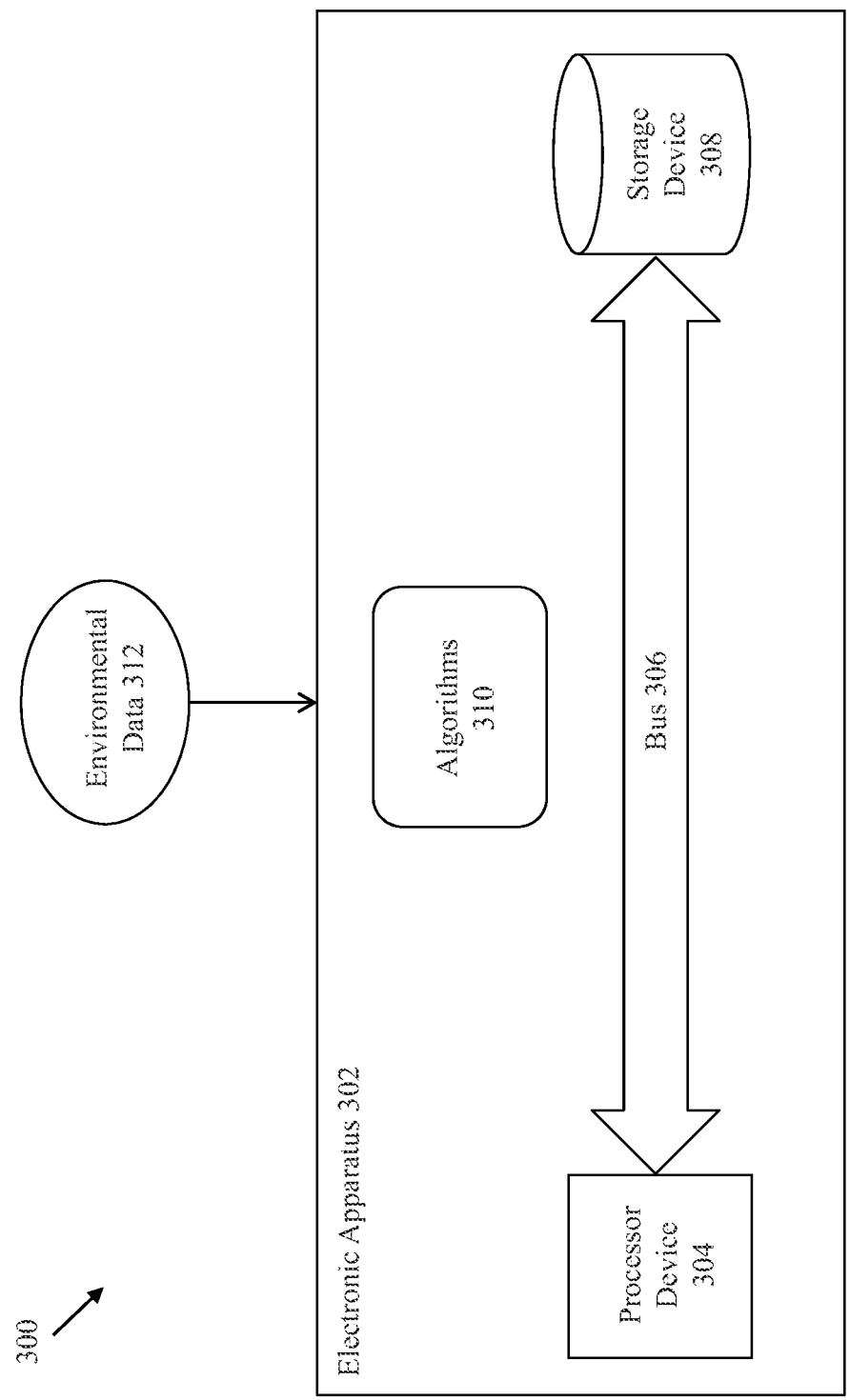

SYSTEM AND METHOD FOR PLACING AN ELECTRONIC APPARATUS INTO A PROTECTED STATE IN RESPONSE TO ENVIRONMENTAL DATA

BACKGROUND OF THE INVENTION

Field of the Invention

The present invention relates generally to systems and methods for controlling and configuring electronic apparatuses.

BRIEF DESCRIPTION OF THE DRAWINGS

Some examples of the invention are described in the following figures:

FIG. 3 is one example of an electronic device for effecting the system and method.

DETAILED DESCRIPTION

Figure 1:
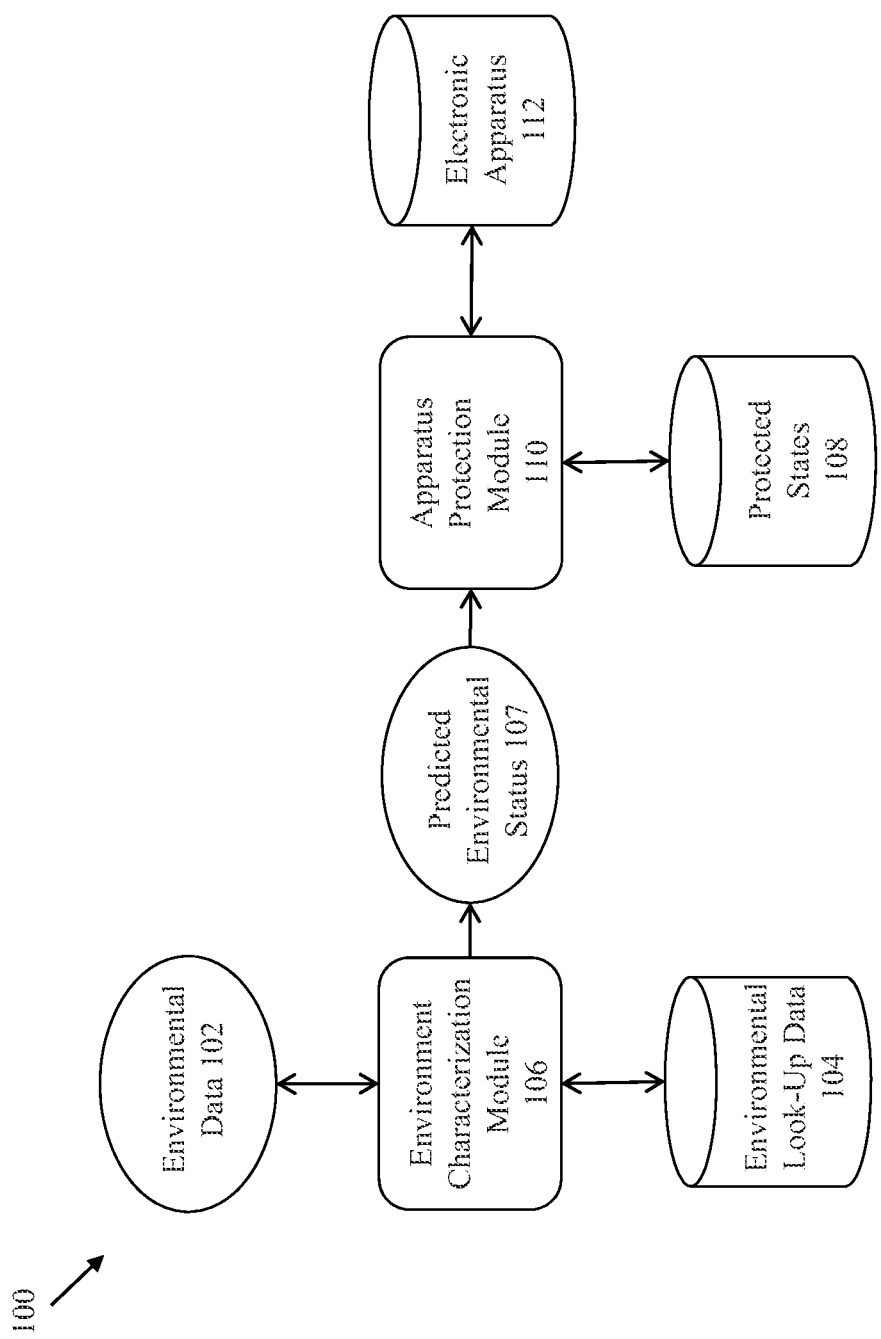
FIG. 1 is one example of a system for placing an electronic apparatus into a protected state in response to environmental data.

Reliable operation of electronic devices is an ongoing pursuit. As technology improves and features are added to devices, new ways to maintain or increase reliability are sought.

One example of such endeavors includes recent improvements to a computer operating systems' ability to transfer data to and from various computer components, including memory and processing devices. In the past, such data blocks for storage devices had a transfer size of 256 blocks (i.e. 128 KiB) of data. New upcoming operating systems, however, have an ability to transfer a much larger number of data blocks, well beyond the previous 256 block limit.

But while the increase in block transfer size increases the performance of data transfers within the computer, it also exposes the computer to a greater chance that an environmental event, such as a power failure or a shock event, will corrupt an equally larger number of data blocks should the environmental event occur while the operating system is writing data to a storage/memory device. Such events during data transfers may not give the computer, the operating system, and/or the storage/memory device enough time to stop the data block transfer process and put the computer, the operating system, and/or the storage/memory device into a safe/protected state (e.g. for a storage device to remove its read/write heads from a hard disc).

Beyond just computers, many other electronic devices may suffer from environmental events peculiar to their own operating environment. The reliability of such devices could be increased if systems and methods could be put in place which could somewhat or completely anticipate a variety of disruptive environmental events. What is needed is are systems and methods which place electronic devices in safer operating mode/state prior to most if not all disruptive environmental events.

The present invention addresses and remedies many, if not all, of the problems discussed above.

The present invention adapts an electronic apparatus to a variety of environments and monitors a set of environmental signals to ensure that the electronic apparatus is placed into a protected state prior to and/or more quickly during an environmental event.

The present invention includes teachings which determines if the electronic apparatus is in a potentially disruptive environment a set of environmental data. These signals include information on whether the electronic apparatus: is moving or stationary; is on a surface, on a boat, on an airplane, or in a truck; is falling off a desk; is on wall-outlet or battery power; and even if the electronic apparatus is in a earthquake-prone region of the world. The present invention integrates the signal data over varying time periods to ensure an up to date environmental signature. The present invention uses such environmental signature data to then place the electronic apparatus in one of a continuum of protected states, depending upon the cumulative threat posed by its current environment.

Thus, the present invention, in the computer data block transfer example embodiment discussed above, ensures that fewer data blocks are at risk when the computer is determined to be in a potentially disruptive environment. The present invention in other example embodiments also enables the electronic apparatus to react more quickly to an environmental event.

Mobile and some other electronic apparatuses in harsh environments may be even more likely than usual to suffer such disruptive environmental events. Regardless, the present invention improves the robustness, performance, and reliability of an electronic apparatus even when there is the possibility that the apparatus will undergo a disruptive event.

Details of the present invention are now discussed.

To begin, an electronic apparatus, as presented, is herein defined to include any electronic: device, article, system, discrete device, aggregation of discrete devices, sub-assemblies, and embedded devices and circuitry. Electronic apparatuses also include computer systems, operational states, hard disc drives, memory devices, optical devices, communications devices, communications protocols, and all associated circuits. Electronic apparatuses further include mechanical and chemical systems which can be controlled by one or more of the aforementioned electronic apparatuses.

FIG. 1 is one example of a system 100 for placing an electronic apparatus 112 into a protected state in response to environmental data 102. An environment characterization module 106, within the system 100, receives and analyzes a set of environmental data 102 and retrieves information from a set of environmental look-up data 104 to characterize the electronic apparatus's 112 environment.

The environmental data 102, in one embodiment, provides direct environmental information on the electronic apparatus 112. "Direct" environmental information is herein defined to include environmental data provided by hardware devices, such as transducers, sensors, and switches. The data provided is unambiguous within the tolerances of the hardware device. In other embodiments of the present invention, the environmental data 102 may include more "processed" data generated after certain ambiguities were resolved.

Some examples of "direct" environmental information provided within the environmental data 102 includes: whether the electronic apparatus 112 is receiving power from a wall-outlet (e.g. AC power) or a battery (e.g. DC power); accelerometer data [note: some hard-drives include accelerometers]; GPS (Global Positioning System) data (e.g. global location/position/region, stationary or movement information, altitude, velocity, acceleration); transducer/sensor data (e.g. temperature, humidity, radiation level); switch status (e.g. "docking station" docked/undocked switch, "Kensington" security lock locked/unlocked switch, etc.); and other special signals.

The environment characterization module 106 then interprets and characterizes the environmental data 102 to generate a predicted environmental status 107 which represents a probability that the electronic apparatus 112 is in one or more environments. The environmental status 107 is herein defined to include environmental conclusions based-on: the environmental data 102; one or more algorithms or heuristics applied to the environmental data 102; comparing the environmental data 102 to the environmental look-up data 104; or some combination of thereof.

The environment characterization module 106 integrates the environmental data 102 over varying time periods, depending upon how the system 100 is optimized and fine tuned. For example, a temperature signal in the environmental data 102 may need to be integrated only over a time period of a few seconds; however, an accelerometer reading might need to be integrated over a minute perhaps, to distinguish between when the system 100 is perhaps moving in a car in contrast to when the system 100 has perhaps only been "accidentally bumped" while resting on a desk.

For embodiments of the present invention employing "algorithms", the algorithmic predictions provided by the environment characterization module 106 are optionally "ground-truthed" based on comparisons the algorithm's conclusions to a known environmental status 107 and corresponding known environmental data 102, thereby ensuring a higher degree of real-world accuracy. In other embodiments, the "algorithms" can be adaptively programmed (e.g. algorithm threshold-levels and/or weightings modified) based on real-time, or subsequent, feedback provided by an, operator which either confirms or refutes the algorithm's environmental status 107 prediction.

For embodiments of the present invention employing the environmental "look-up" data 104, the look-up data accessed by the environment characterization module 106 includes a set of tolerances and range-limits, which have been "ground-truthed" according to a known environmental status 107 and corresponding known environmental data 102. Implementations employing the "look-up" data have a potential to generate the environmental status 107 prediction faster, thus protecting the electronic apparatus 112 more quickly.

Some examples of the environmental status 107 generated by the environment characterization module 106, include predictions that the electronic apparatus 112 is: currently stationary; likely to remain stationary; currently moving; likely to be moving in the future; currently falling; likely to imminently sustain a disruptive/shock event; is in a potentially disruptive environment; is likely to be on a boat, is likely to be on an airplane, is likely to be in a land vehicle; is in an earthquake-prone region of the world; and "earthquake" detected. Many other unique environmental status 107 definitions are possible depending upon how each instance of the present invention is implemented.

Some examples of "how" the environment characterization module 106 can be programmed to generate the environmental status 107 of the electronic apparatus 112, are now provided. These examples are flexible and can be adapted and expanded upon to meet the needs of each implemented instance of the present invention.

For example, the environment characterization module 106 can set the environmental status 107: to "currently stationary" if the GPS data indicates no movement; to "likely to remain stationary" if the apparatus 112 is connected to an AC power source; to "likely to be mobile" if the apparatus 112 is connected to an DC battery power source; to "currently moving" if GPS or accelerometer data so indicate; to "currently falling", again depending upon the accelerometer data; and so on. GPS signature data can provide much detail on the environmental status 107 of the electronic apparatus 112 which coupled with static ground data can indicate whether the electronic apparatus 112 is traveling at altitude (e.g. in a plane susceptible to air turbulence), at sea level over water (e.g. on a boat), at ground level on a dirt road (e.g. in a vehicle being jolted by rocks), and so on.

The apparatus protection module 110 then interprets and characterizes the environmental status 107, provided by the environment characterization module 106, and selects one of a set of protected states 108 in which to place the electronic apparatus 112. The apparatus protection module 110 selects one of the protected states 108 based-on: the environmental status 107; one or more algorithms or heuristics applied to the environmental status 107; comparing the environmental status 107 to matching "look-up" criteria in the protected states 108; or some combination of thereof.

Like the environment characterization module 106, discussed above, the apparatus protection module 110 integrates the environmental status 107 over varying time periods, depending upon how the system 100 is optimized and fine tuned.

In one embodiment of the present invention, the apparatus protection module 110 can place the electronic apparatus 112 in one of a set of protected states 108 (e.g. a binary set of "normal" or "abnormal"). However, in another embodiment of the present invention, the apparatus protection module 110 can place the electronic apparatus 112 in one of a continuum of protected states 108, depending upon a cumulative and dynamic threat posed by the environment.

For embodiments of the present invention employing "algorithms", the protected states 108 selectable by the apparatus protection module 110 are optionally "ground-truthed" based on comparisons the algorithm's conclusions to a set of known successful protected states 108 corresponding to known environmental status 107 predictions, thereby ensuring a higher degree of real-world reliability and performance for the electronic apparatus 112. In other embodiments, the "algorithms" can be adaptively programmed (e.g. algorithm threshold-levels and/or weightings modified) based on real-time, or subsequent, feedback provided by an operator which either confirms or refutes the algorithm's selection of one of the protected states 108.

For embodiments of the present invention matching the environmental status 107 to the "look-up" criteria in the protected states 108, the look-up criteria accessed by the apparatus protection module 110 includes a set of tolerances and range-limits, which have been "ground-truthed" according to a set of known successful protected states 108 corresponding to the environmental status 107. Implementations employing the "look-up" data have a potential to be faster, and thus protect the electronic apparatus 112 more quickly.

Some examples of a continuum of possible protected states 108 selectable by the apparatus protection module 110, include: normal, abnormal, a percentage % threat-level; full performance, degraded performance; hardware on; hardware off; hard-drive head parked; hard-drive head not parked; maximum data block size transfers; minimal data block size transfers; and so on.

In one example of "how" the apparatus protection module 110 can be programmed to select between various protected states 108, if electronic apparatus 112 is a notebook computer and the environmental status 107 indicates that the notebook computer is "stationary", then the apparatus protection module 110 places the notebook computer into a first protected state 108, which permits the notebook computer to transfer data blocks greater than a predetermined size (e.g. 256 data blocks) at a time between various resources (e.g. a storage device) within the notebook computer. However, if the environmental status 107 indicates that the notebook computer is "mobile", then the apparatus protection module 110 places the notebook computer into a second protected state 108, which limits the notebook computer to transfer data blocks less than or equal to a predetermined size (e.g. 256 data blocks) at a time between various resources within the notebook computer.

More specifically, if the notebook's storage device utilizes an ATA command set, the data block transfer limits can be varied using a "Set Feature" command (Command code EFh) within the ATA/ATAPI Command Set. This enables specific predetermined interface register values to be set within the Features Register and/or the following registers: Sector Count, LBA Low, LBA Mid, and LBA High.

Alternatively in the example just discussed, the first protected state 108 could program a device driver (e.g. a storage device driver) to request transfers of data blocks greater than the predetermined size (e.g. 256 data blocks); and the second protected state 108 could program the device driver to request transfers of data blocks less than or equal to the predetermined size (e.g. 256 data blocks). The data block transfer limits, in one embodiment, enables the notebook's hard drive read/write heads to be "parked/secured" more quickly to help prevent a hard disk crash.

Some other examples of "how" the apparatus protection module 110 can be programmed to select between various protected states 108, include: if the environmental status 107 is "currently stationary" or "likely to remain stationary", then a protected state 108 of "normal" is selected and the electronic apparatus 112 operates at it full capabilities. Or, if the environmental status 107 is "currently falling" or "likely to imminently sustain a disruptive/shock event", then a protected state 108 of "abnormal" is selected and the electronic apparatus 112 operates at its most limited capabilities. Or, if the environmental status 107 is "currently moving", "likely to be moving in the future"; "is likely to be on a boat", or "is likely to be on an airplane", then a protected state 108 of "percentage % threat-level" is selected and the electronic apparatus 112 operates at a predetermined % of its capabilities. A variable set of protected states 108 that incrementally and gracefully modify the performance capabilities of the electronic apparatus 112 based-on the real-time variation of the environmental status 107 is also possible.

Thus, the present invention ensures that fewer resources are at risk when the electronic apparatus 112 is determined to be in a disruptive or potentially disruptive environment; and, enables the electronic apparatus 112 to react more quickly to an environmental disruption.

Figure 2:
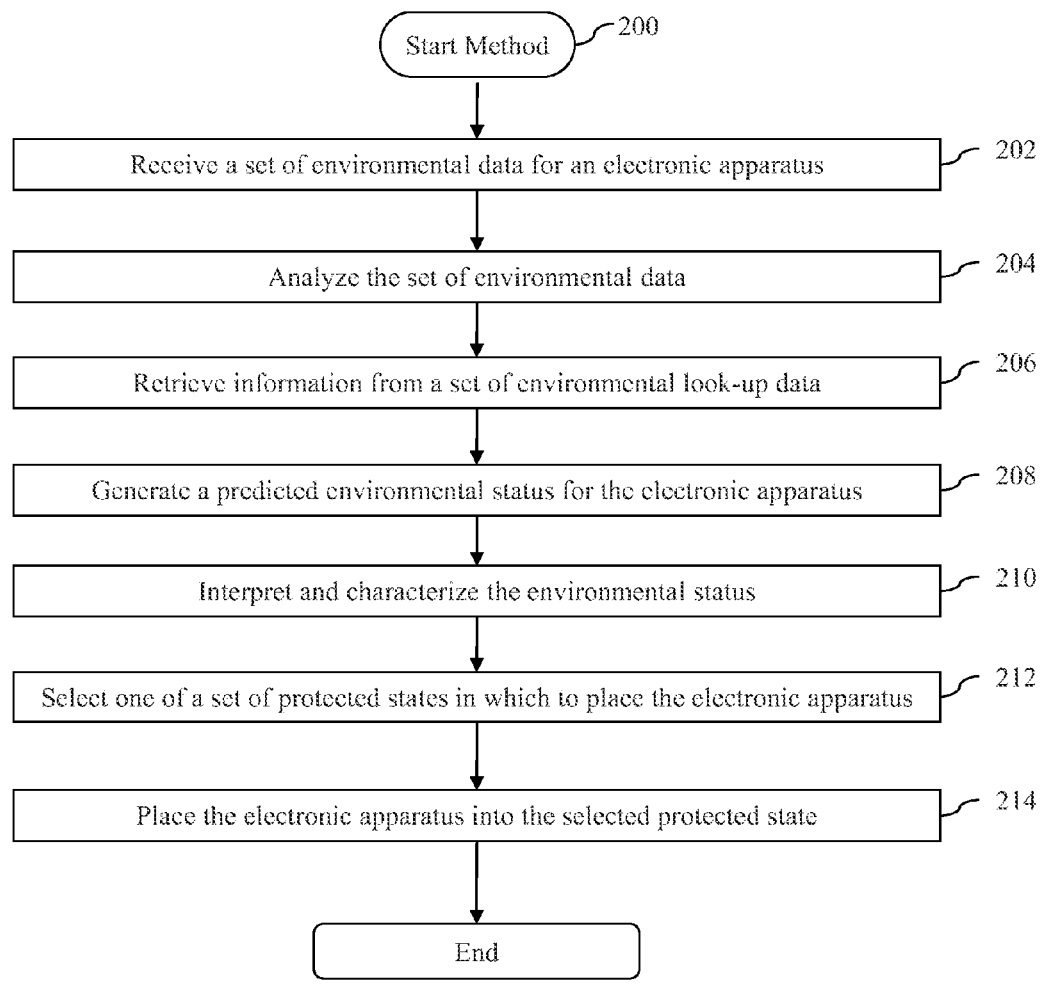
FIG. 2 is a flowchart of one example of a method for placing an electronic apparatus into a protected state in response to environmental data.

FIG. 2 is a flowchart of one example of a method 200 for placing an electronic apparatus 112 into a protected state in response to environmental data 102. Those skilled in the art will recognize that while one example of the present invention's method is now discussed, the material in this specification can be combined in a variety of ways to yield other examples as well. The method next discussed is to be understood within a context provided by this and other portions of this detailed description.

The method 200 begins in block 202, when the environment characterization module 106, receives a set of environmental data 102. In block 204, the environment characterization module 106 analyzes the set of environmental data 102.

In block 206, the environment characterization module 106 retrieves information from a set of environmental look-up data 104.

Next, in block 208, the environment characterization module 106 generates a predicted environmental status 107 for the electronic apparatus 112, based-on the environmental data 102 and the environmental look-up data 104.

In block 210, the apparatus protection module 110 interprets and characterizes the environmental status 107. Then in block 212, the apparatus protection module 110 selects one of a set of protected states 108 in which to place the electronic apparatus 112. In block 214, the apparatus protection module 110 places the electronic apparatus 112 into the selected protected state 108.

FIG. 3 is one example 300 of an electronic apparatus 302 for effecting the system 100 and method 200. The electronic apparatus 302 includes a processor device 304, a bus 306, a storage device 308, and algorithms 310 for processing the environmental data 312 and placing the electronic apparatus 302 into a protected state, stored in the storage device 308, as required by the system 100 and method 200.

The processor device 304 includes a processor (such as a central processing unit, CPU, microprocessor, application-specific integrated circuit (ASIC), etc.) for controlling the overall operation of the storage device 308 (such as random access memory (RAM) for temporary data storage, read only memory (ROM) for permanent data storage, firmware, flash memory, external and internal hard-disk drives, and the like).

The processor device 304 communicates with the storage device 308 and algorithms 310 using the bus 306 and performs operations and tasks that implement one or more blocks of the flow diagrams discussed herein. The storage device 308, for example, stores applications, data, programs, algorithms (including software to implement or assist in implementing embodiments in accordance with the present invention) and other data.

Instructions of software described above are loaded for execution on a processor (such as one or more CPUs). The processor includes microprocessors, microcontrollers, processor modules or subsystems (including one or more microprocessors or microcontrollers), or other control or computing devices. A "processor" can refer to a single component or to plural components In one example embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

In some example embodiments, the methods illustrated herein and data and instructions associated therewith are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

Note that a set of files refers to any collection of files, such as a directory of files. A "file" can refer to any data object (e.g., a document, a bitmap, an image, an audio clip, a video clip, software source code, software executable code, etc.). A "file" can also refer to a directory (a structure that contains other files).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations thereof. It is intended that the following claims cover such modifications and variations as fall within the true spirit and scope of the invention.

What is claimed is:

1. A non-transitory computer-readable storage medium (CRSM) containing computer instructions that, when executed, cause a computer processor to:
   receive a set of environmental data indicative of movement of a portable electronic apparatus;
   generate an environmental status applicable to the portable electronic apparatus based-on the environmental data; and
   place the portable electronic apparatus into a protected state based-on the environmental status, wherein the protected state modifies the performance capabilities of the portable electronic apparatus.

2. The non-transitory CRSM of claim 1:
   wherein the environmental data is provided by one from a group including a: transducer, sensor, and switch.

3. The non-transitory CRSM of claim 1:
   wherein the environmental data is provided by one from a group including: an AC/DC power source signal; a wall-outlet/battery power source signal; an accelerometer signal; GPS (Global Positioning System) data; temperature; humidity; radiation level; a computer dock/undocked signal; and a computer locked/unlocked switch.

4. The non-transitory CRSM of claim 1:
   wherein the computer instructions further cause the computer processor to:
   integrate the environmental data over at least one predetermined time period; and
   determine the environmental status based-on a probability that the portable electronic apparatus is in at least one of a set of environments, using one from a group of techniques including: weighting algorithms; thresholds; heuristics; and environmental look-up data.

5. The non-transitory CRSM of claim 4:
   wherein the computer instructions further cause the computer processor to:
   ground truth the environmental status determination based-on feedback provided by an operator which either confirms or refutes the environmental status determination.

6. The non-transitory CRSM of claim 1:
   wherein the environmental status is one from a group including: stationary; moving; to be moving; falling; likely to imminently sustain a disruptive/shock event; is in a potentially disruptive environment; proximate to a boat; proximate to an airplane; proximate to a land vehicle; and proximate to an earthquake.

7. The non-transitory CRSM of claim 1:
   wherein the computer instructions further cause the computer processor to:
   integrate the environmental status over at least one predetermined time period; and
   determine the protected state based-on a probability that the portable electronic apparatus is attributed with at least one of a set of environmental statuses, using one from a group of techniques including: weighting algorithms; thresholds; heuristics; and environmental look-up data.

8. The non-transitory CRSM of claim 1:
   wherein the protected state is one from a group including: a binary state; normal; abnormal; a continuum of protected states dependent upon a cumulative and dynamic threat posed by the environment; a percentage % threat-level; full performance, degraded performance; hardware on; hardware off; hard-drive head parked; hard-drive head not parked; maximum data block size transfers; and minimal data block size transfers.

9. The non-transitory CRSM of claim 1:
   wherein the portable electronic apparatus is one from a group including a: computer; notebook computer; a handheld computer; a disc drive; and a communications circuit; and an electronically controlled mechanical device.

10. The non-transitory CRSM of claim 1:
    wherein the portable electronic apparatus is a computer; and
    wherein the computer instructions further cause the computer processor to:
    transfer data blocks greater than a predetermined set of data blocks, if an accelerometer indicates that the computer is not falling; and prohibit data block transfers greater than the predetermined set of data blocks, if an accelerometer indicates that the computer is falling.

11. The non-transitory CRSM of claim 10:
    wherein the predetermined set of data blocks is 256 data blocks.

12. The non-transitory CRSM of claim 1:
    wherein the portable electronic apparatus is a computer; and
    wherein computer instructions further cause the computer processor to:
    transfer data blocks greater than a predetermined set of data blocks, if the computer is on AC power; and
    prohibit data block transfers greater than the predetermined set of data blocks, if the computer is on DC power.

13. The non-transitory CRSM of claim 1:
    wherein the portable electronic apparatus is a computer; and
    wherein the computer instructions further cause the computer processor to:
    transfer data blocks greater than a predetermined set of data blocks, if the computer is stationary; and
    prohibit data block transfers greater than the predetermined set of data blocks, if the computer is mobile.

14. The non-transitory CRSM of claim 1:
    wherein the portable electronic apparatus is a computer; and
    wherein the computer instructions further cause the computer processor to:
    alter a device driver to request transfers greater than a predetermined set of data blocks, if the computer is stationary; and alter the device driver to request transfers not greater than the predetermined set of data blocks, if the computer is mobile.

15. A system, comprising:
a processor to operate an environmental characterization module and an apparatus protection module;
wherein the environment characterization module receives a set of environmental data indicative of movement of a portable electronic apparatus, and generates an environmental status applicable to the portable electronic apparatus based-on the environmental data; and
wherein the apparatus protection module places the portable electronic apparatus into a protected state based-on the environmental status, wherein the protected state modifies the performance capabilities of the portable electronic apparatus.

16. The system of claim 15:
wherein the portable electronic apparatus is a computer; and
wherein the apparatus protection module:
transfers data blocks greater than a predetermined set of data blocks, if an accelerometer indicates that the computer is not falling; and
prohibits data block transfers greater than the predetermined set of data blocks, if an accelerometer indicates that the computer is falling.

17. The system of claim 15:
wherein the portable electronic apparatus is a computer; and
wherein the apparatus protection module:
transfers data blocks greater than a predetermined set of data blocks, if the computer is on AC power; and
prohibits data block transfers greater than the predetermined set of data blocks, if the computer is on DC power.

18. The system of claim 15:
wherein the portable electronic apparatus is a computer; and
wherein the apparatus protection module:
transfers data blocks greater than a predetermined set of data blocks, if the computer is stationary; and
prohibits data block transfers greater than the predetermined set of data blocks, if the computer is mobile.

19. The system of claim 15:
wherein the portable electronic apparatus is a computer; and
wherein the apparatus protection module:
programs a device driver to request transfers greater than a predetermined set of data blocks, if the computer is stationary; and
programs the device driver to request transfers not greater than the predetermined set of data blocks, if the computer is mobile.

20. A portable electronic apparatus, comprising:
a storage device, containing a set of algorithms;
a processor device, configured to execute the algorithms;
a bus permitting communication between the storage device and processor device; and
wherein the set of algorithms include instructions for operating the processor device for:
receiving a set of environmental data indicative of movement of the portable electronic apparatus;
generating an environmental status applicable to the portable electronic apparatus based-on the environmental data; and
placing the portable electronic apparatus into a protected state based-on the environmental status, wherein the protected state modifies the performance capabilities of the portable electronic apparatus.

* * * * *